Patented Sept. 12, 1939

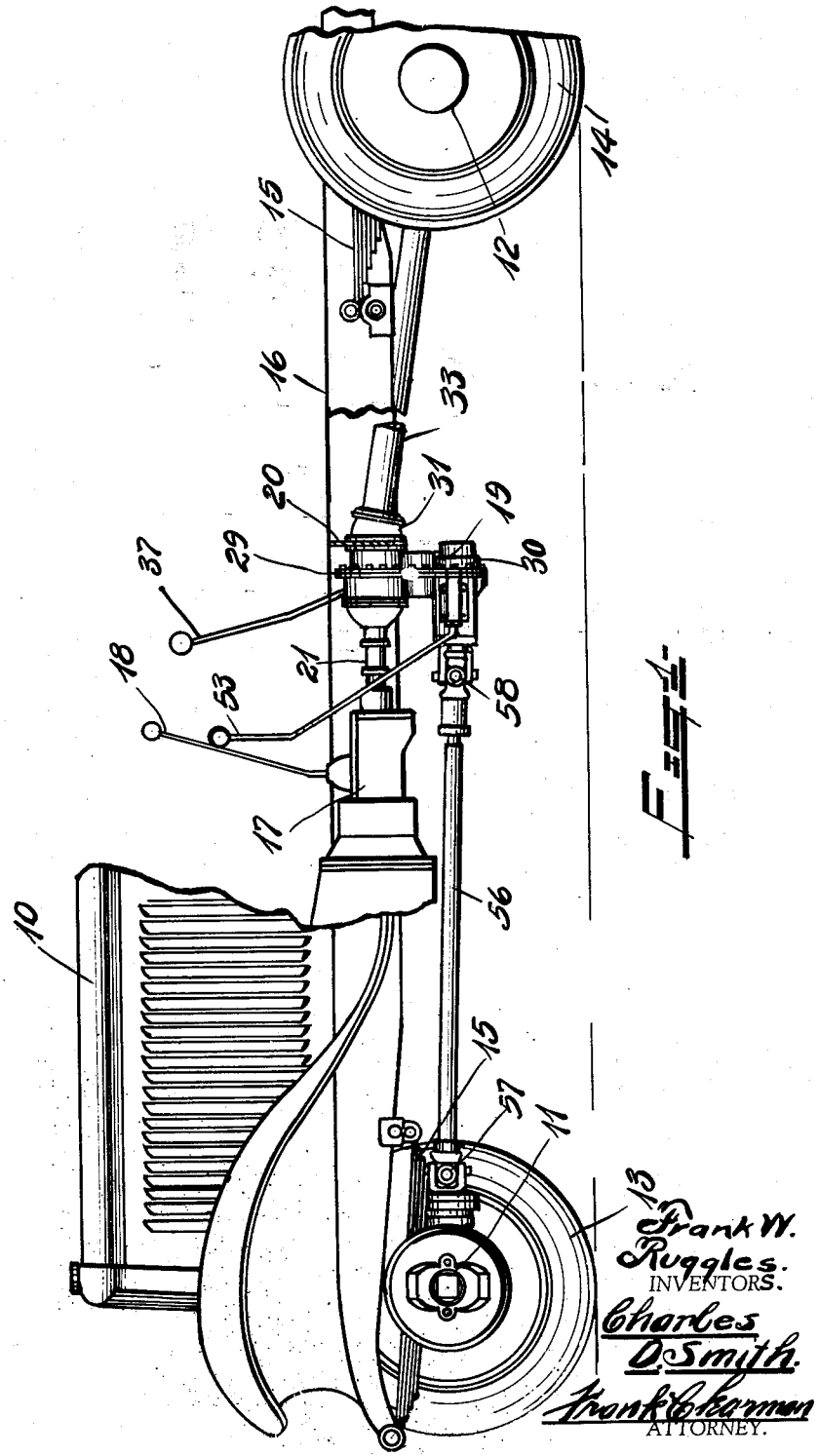

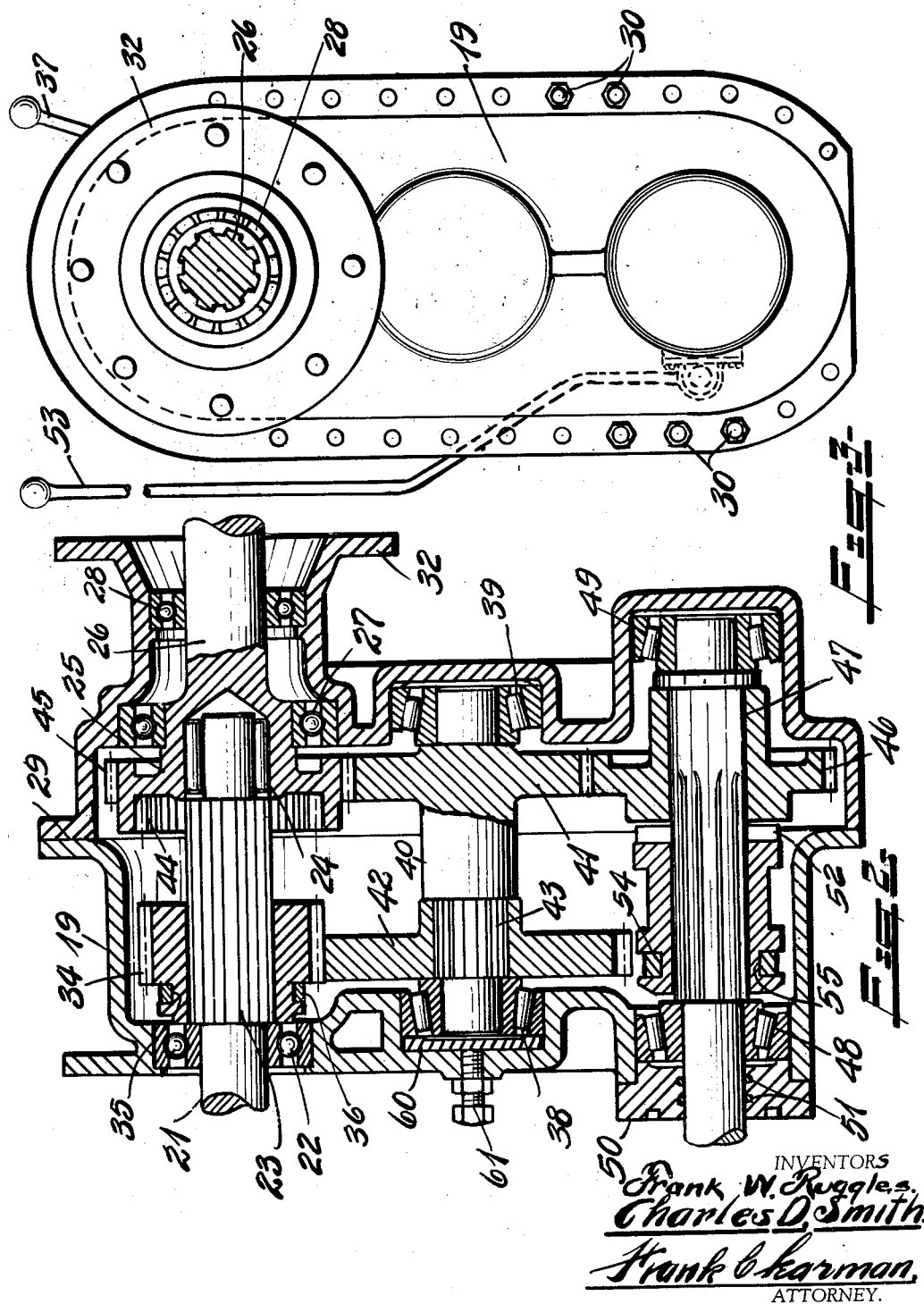

2,173,044

UNITED STATES PATENT OFFICE 2,173,044

AUXILIARY TRANSMISSION MECHANISM FOR FOUR-WHEEL-DRIVE AUTOMOTIVE VEHICLES

Frank W. Ruggles and Charles D. Smith, Alma, Mich., assignors, by mesne assignments, to Alma Motor Company, Dover, Del., a corporation of Delaware Application February 23, 1935, Serial No. 7,751

12 Claims. (Cl. 180—44)

This invention relates to vehicle driving mechanism by means of which a conventional automotive vehicle having the usual rear driven axle can be converted into a four-wheel drive vehicle.

One of the prime objects of the invention is to design a driving mechanism which normally drives the rear drive axle, and provides auxiliary means operatively connected to said driving mechanism and to the front axle, whereby said front axle may be connected and utilized as a driving axle when circumstances, load and traction require, and which can be easily and readily engaged and/or disengaged so that the vehicle may selectively operate as a two-wheel drive when traveling over good roads and highways, and as a four-wheel drive vehicle when road conditions, traction, and/or load require additional traction and power.

Another object is to provide simple, practical, and positive means for selectively utilizing the front axle as a driving axle when desired, said means being manually controlled and being subject to all of the vehicle transmission speeds, so that suitable relative low gear ratios can be realized for heavy haulage, or relative high ratios realized for speed and light duty work.

A further object is to provide simple and comparatively inexpensive means for converting from a two-wheel to a positive four-wheel drive without necessitating the complicated mechanism and cost of a conventional four-wheel drive vehicle, with its initial high cost and future maintenance.

A still further object is to design a driving mechanism which is readily applicable to low priced specially designed vehicles developed and adapted for improved concrete highways, and by means of which the vehicle can be satisfactorily operated over subgrades, in gravel pits, sand holes, or other places where regular equipment is impractical, without in any manner affecting its capacity to perform the work of the conventional vehicle on good roads.

In the drawings—

Fig. 1 is a fragmentary side view of a conventional motor vehicle showing my driving mechanism in place thereon.

Fig. 2 is an enlarged sectional view of the transfer case.

Fig. 3 is a rear end view thereof.

Referring now more specifically to the drawings, the numeral 10 indicates a conventional motor vehicle equipped with front and rear axles 11 and 12 respectively, and on which ground engaging wheels 13 and 14 are mounted in the usual manner. Springs 15 are provided on each axle and support a fabricated frame 16, and a transmission 17 is connected to an engine (not shown), and includes a shifting lever 18 for shifting to secure the desired speeds.

A transfer gear case 19 is secured to a transversely disposed cross member 20 which forms a part of the vehicle frame, and a main drive shaft 21 extends from the transmission into said case and is journaled in a bearing 22 provided therein, a section of said shaft being splined as shown at 23, and for a purpose to be presently described, the extreme end of the shaft being reduced and being journalled in a bearing 24 which is mounted in the gear 25, said gear being provided on the end of the drive shaft section 26 which leads to the rear axle, the hub of the gear 25 being journalled in bearings 27, and a similar bearing 28 being provided in the case as usual.

The transfer case is preferably formed in two sections, being split on the line 29 and is secured together by means of bolts 30 in the conventional manner.

A universal joint housing 31 is secured to the flange 32 of the housing, and a torque tube 33 incloses the drive shaft and leads to the rear axle differential in the usual manner.

The mechanism to which this application is directed includes a creeper gear 34 which is slidably mounted on the shaft section 23, the hub of said gear being grooved as at 35 to accommodate a collar 36 to which a shifting lever 37 is connected in the conventional manner.

Bearings 38 and 39 respectively are mounted in the transfer case, and an intermediate shaft 40 is journaled therein, a gear 41 being formed integral with the shaft, and a similar gear 42 is mounted on the splined section 43 of said shaft, said gear meshing with and being driven by the creeper gear 34 when said gear is shifted to predetermined position and into engagement therewith.

The gear 25 has both internal and external teeth, the internal teeth 44 meshing with the creeper gear 34 when said gear is shifted into engaging position, the external teeth 45 meshing with and driving the gear 41, said gear 41 in turn meshing with and driving the gear 46 which is mounted on the clutch shaft 47 which is in turn journalled in bearings 48 and 49 respectively provided in the transfer case, the front end of said clutch shaft being turned, and an end plate 50 forms a closure for the opening in the case, oil rims 51 being provided to prevent the escape of lubricant.

A dog clutch 52 is slidably mounted on the clutch shaft 47 and is shiftable into and out of engagement with the clutch shaped end of the gear 46, said clutch being shifted by means of a lever 53 which extends to a position directly adjacent the driver's seat, a collar 54 being mounted in the groove 55 so that the conventional hookup may be utilized.

The front axle is provided with a differential similar to the rear axle and is designed to permit the application of power to the front wheels without affecting the steering or the driving of the rear axle; a front axle propeller shaft 56 being operatively connected to the front axle differential and to the clutch shaft 47 in the transfer case, so that the front axle may be positively driven with the rear axle and be subject to the various speeds thereof, the clutch 52 providing for the engaging or disengaging of the front axle.

Universal joints 57 and 58 are provided intermediate the length of the front axle propeller shaft to provide the necessary flexibility, this propeller shaft driving the front axle in exactly the same manner and at the same speeds as the rear axle.

A bearing adjusting plate 60 is provided on the end of the bearing 38, and an adjusting stud 61 is mounted in the end wall of the transfer case, said stud bearing against said plate to adjust and take up bearing wear.

It will, of course, be obvious that the gears in the transfer case are subject to all of the transmission speeds, and that the ratios of the gears in the case provide for further reductions beyond that afforded by the transmission, so that a creeping speed as low as approximately 84 to 1 can be provided. The power application to both front and rear axles is identical and is through the gears in the transfer case, the rear axle being driven at all times when the engine clutch and transmission gears are engaged, while the front axle is driven only when the clutch 52 is engaged.

When the gears are in position as shown in Fig. 2 of the drawings, the power application is through the gears 34, 42, 41, and 45 to the shaft 26 which drives the rear axle; this provides for one gear ratio beyond the transmission, and I wish to direct particular attention to the fact that the gear 41 meshes with and drives the gear 46 which is mounted on the clutch shaft 47, and when the clutch 52 is shifted into engagement with the gear 46, it will be obvious that the front axle will be driven at the same R. P. M. as the rear axle.

Another gear ratio is provided by shifting the creeper gear 34 into engagement with the clutch element 44, which is mounted on the end of the main drive shaft, and this clutch element 44 in turn drives the gear 46 through instrumentality of the gears 45 and 41 so that the front axle will also be driven at the same R. P. M. as is the rear axle, the position of the clutch 52 determining whether or not the front axle shall be used as a drive axle.

The mechanism is simple, practical, and substantial; it can be easily and quickly operated; it enables low priced trucks designed for high speed on hard surfaced roadways to be utilized for heavy hauling where road conditions are such that low priced light trucks could not be used, thereby materially enhancing the earning and load capacity of said trucks without the sacrifices of speed or other features.

From the foregoing description it will be obvious that we have perfected a very simple, practical, and inexpensive driving mechanism by means of which the conventional rear wheel drive automotive vehicle can be converted into a four-wheel drive when desired.

What we claim is:

1. In an auxiliary gear box, a drive shaft, a driven shaft, a gear on the driven shaft, one end of the drive shaft being piloted in said gear, internal clutch teeth in said gear, intermediate shaft with gears mounted thereon to rotate therewith, one of said gears meshing with the gear on said driven shaft, a shiftable creeper gear mounted on the drive shaft and shiftable into and out of engagement with one of the intermediate gears and/or the internal clutch teeth on the driven shaft gear, a second driven shaft, a gear rotatably mounted thereon and meshing with one of the intermediate gears, and a clutch mounted on said second driven shaft for engaging or disengaging said gear therewith so that said second driven shaft is subject to all speed changes in the intermediate gears and creeper gear.

2. In an auxiliary gear box, a main drive shaft journaled in said box, a driven shaft in alignment with said drive shaft and formed with a gear provided with internal clutch teeth, an intermediate shaft, gearing mounted thereon and meshing with said gear, a second driven shaft, a gear mounted thereon and meshing with one of the intermediate gears, a creeper gear on the drive shaft and shiftable into engagement with a gear on the intermediate shaft or into direct engagement with said internal clutch teeth, and a clutch shiftable into engagement with the gear on the second driven shaft for driving said second driven shaft at the same R. P. M. as the first driven shaft.

3. In an auxiliary gear box, a main drive shaft, a driven shaft in alignment with the main drive shaft, a gear provided thereon and formed with internal clutch teeth, an intermediate shaft, gears mounted thereon and in driving engagement with said gear, a second driven shaft, a gear mounted thereon and driven from the intermediate shaft, a shiftable creeper gear on the main drive shaft and adapted in one position to have direct driving engagement with the first driven shaft, and in another position to drive said first driven shaft through the intermediate shaft, and a clutch on the second driven shaft for shifting it into or out of driving engagement with the first driven shaft.

4. In an auxiliary transmission gear box, a drive shaft journaled in the gear box, a driven shaft journaled in the gear box in axial alignment with the drive shaft, a gear on the end of the driven shaft and provided with internal clutch teeth, the end of the drive shaft being journaled in said gear, a second driven shaft journaled in the gear box, a gear mounted on the second driven shaft, a clutch engageable with the said gear for selectively driving the second driven shaft with the first driven shaft, gearing intermediate said gear on the first driven shaft and the gear on the second driven shaft, a gear slidably mounted on the drive shaft to engage the internal clutch teeth of the gear on the first drive shaft, and an intermediate gear with which said slidable gear may be brought to mesh on disengagement with the internal clutch teeth to drive the intermediate gear and thereby drive the first driven shaft and the second driven shaft at a reduced speed.

5. A power transmission unit for automobiles comprising, as a unitary structure, a shell structure having journaled therein, (a) a power receiving shaft connectible to the power delivery train of a motor, (b) a power delivery shaft aligned with said power receiving shaft and connectible at its outer end with a shaft leading to rear traction wheels, (c) an intermediate shaft and (d) a second power delivery shaft connectible at one end with a shaft leading to front traction wheels, a gear carried by shaft (d), a gear carried by shaft (c) and meshing with said last mentioned gear, a gear carried by shaft (b) and meshing with the gear carried by shaft (c), a second gear carried by shaft (c), a clutch carried by shaft (b), and a gear splined upon shaft (a) and meshable with the second gear on shaft (c) or clutchable with the clutch of shaft (b).

6. In a power transmitting mechanism, a gear casing, a power input shaft journaled in said casing and projecting away from one face thereof, a primary power output shaft journaled in said casing and axially aligned with said power input shaft, said primary power output shaft projecting beyond the opposite face of said casing and adapted to have power taken therefrom, a secondary power output shaft journaled in said casing and disposed parallel to said first named shafts, said secondary power output shaft projecting beyond a face of said casing and adapted to have power taken therefrom, and power transmitting means disposed in said casing, comprising a countershaft disposed parallel to, and in the plane of said power input and output shafts, and gears for simultaneously transmitting power from said input shaft to said primary and secondary power output shafts, said power transmitting means being selectively operable to disconnect said power input shaft from said power output shafts.

7. In a power transmitting mechanism, a gear casing, a power shaft journaled in one wall of said casing and provided with a gear within the casing, a second power shaft aligned with said gear and journaled therein and projecting through the opposite wall of said casing, a third power shaft projecting into said casing and journaled therein with its axis parallel to that of the aforementioned shafts; a countershaft journaled in said casing between said second and third shafts with its axis in the single common plane thereof; a gear on said third shaft and a pair of gears on said countershaft, one of said countershaft gears being constantly in mesh with the first-mentioned gear and the gear of the third shaft; and a toothed clutch member slidable axially of the second-mentioned power shaft to selectively couple the latter with either said first mentioned gear or with the other countershaft gear.

8. In a power transmitting mechanism, the combination set forth in claim 6, wherein the gears on said output shafts are of the same size.

9. In a power transmitting mechanism, the combination set forth in claim 7, wherein the gears on said counter-shaft are of different sizes.

10. In a power transmitting mechanism, in sub-combination, a casing, a pair of axially aligned shafts rotatably supported in said casing, one of said shafts having a recessed end in which one end of said other shaft is journaled, said recessed end of said one shaft also being provided with a series of internal clutch teeth, a counter-shaft mounted for rotation in said casing and disposed parallel to said first-named shafts, a gear mounted on said counter-shaft, and a clutch gear slidably but non-rotatably mounted on said other of said pair of shafts and having a single series of external teeth adapted to be selectively meshed with said internal clutch teeth and said counter-shaft gear.

11. In a power transmitting mechanism, a gear casing, a power input shaft, a primary power output shaft axially aligned therewith, a secondary power output shaft and a counter-shaft arranged between said power input shaft and said secondary power output shaft, bearings for mounting said shafts, bearing means for rotatably mounting said input shaft within an end of said primary power output shaft, gearing associated with said shafts for transmitting power from said input shaft to said output shafts, and clutch means operable to connect and disconnect said input shaft from said output shafts.

12. In a power transmitting mechanism, a gear casing, a power input shaft journaled in said casing and projecting away from one face thereof, a primary power output shaft journalled in said casing and axially aligned with said power input shaft, said primary power output shaft projecting beyond the opposite face of said casing and adapted to have power taken therefrom, one end of said power input shaft being journalled upon one end of said primary power output shaft, a secondary power output shaft journalled in said casing and disposed parallel to said first-named shafts, said secondary power output shaft projecting beyond a face of said casing and adapted to have power taken therefrom, and power transmitting means disposed in said casing, comprising a counter-shaft and gears, for simultaneously transmitting power from said power input shaft to said primary and secondary power output shafts, said power transmitting means having means selectively operable to disconnect said power input shaft from said power output shafts and comprising a jaw clutch splined upon said power input shaft and selectively engageable with teeth provided on said primary power output shaft.

FRANK W. RUGGLES.
CHARLES D. SMITH.